United States Patent [19]

Kitagishi et al.

[11] Patent Number: 4,547,663
[45] Date of Patent: Oct. 15, 1985

[54] FOCUS DETECTING APPARATUS WITH A COMPENSATION MASK

[75] Inventors: Nozomu Kitagishi, Kawasaki; Shin Yamaguchi, Hiratsuka; Shinji Sakai; Takao Kinoshita, both of Tokyo; Takashi Kawabata, Kamakura; Nobuhiko Shinoda, Tokyo; Kazuya Hosoe, Machida, all of Japan

[73] Assignee: Canon Kabushiki Kaisha, Tokyo, Japan

[21] Appl. No.: 596,575

[22] Filed: Apr. 5, 1984

Related U.S. Application Data

[63] Continuation of Ser. No. 531,628, Sep. 13, 1983, abandoned, which is a continuation of Ser. No. 328,187, Dec. 7, 1981, abandoned.

[30] Foreign Application Priority Data

Dec. 12, 1980 [JP] Japan .................. 55-176002

[51] Int. Cl.⁴ ........................... G01J 1/20
[52] U.S. Cl. ...................... 250/201; 250/204; 250/237 R; 354/406
[58] Field of Search .......... 250/201, 204, 237, 578, 250/216, 208, 209; 354/402, 406, 407, 408; 350/314

[56] References Cited

U.S. PATENT DOCUMENTS

| | | | |
|---|---|---|---|
| 3,975,631 | 8/1976 | Takeda | 250/201 |
| 4,247,763 | 1/1981 | Stauffer | 250/204 |
| 4,350,443 | 9/1982 | Williamson | 250/237 G X |
| 4,352,545 | 10/1982 | Uno et al. | 354/406 |

*Primary Examiner*—David C. Nelms
*Attorney, Agent, or Firm*—Fitzpatrick, Cella, Harper & Scinto

[57] ABSTRACT

A focus detecting apparatus is disclosed which includes a focusing optical system for forming an object image on a predetermined focal plane and photoelectric devices disposed before and behind the focal plane at substantially equal distances from the plane. The photoelectric devices detect the focus states of the object images formed thereon respectively. The focus state of the object image on the focal plane is detected depending on whether or not the focus states on the photoelectric devices are equal to each other. According to the invention such a focus detecting apparatus further includes a mask for gradually decreasing the quantity of light incident upon the photoelectric devices in the direction away from the center of the incident beam. Under the action of such a mask, the focus states of object images before and behind the predetermined focal plane at substantially equal distances from the focal plane are made approximately equal to each other.

3 Claims, 22 Drawing Figures

FOCUS DETECTING APPARATUS WITH A COMPENSATION MASK

This application is a continuation of application Ser. No. 513,628 filed Sept. 13, 1983, now abandoned, which in turn is a continuation of application Ser. No. 328,187 filed Dec. 7, 1981, now abandoned.

BACKGROUND OF THE INVENTION

1. Field of the Invention

The present invention relates to a focus detecting apparatus. More particularly, the present invention is directed to improvements in a type of focus detecting apparatus in which the detection of in-focus position is carried out by detecting defocused object images at two positions of substantially equal distance from the focal plane of an image forming optical system before and behind the focal plane.

2. Description of the Prior Art

Focus detection apparatus of the type mentioned above is known in the art and the principle of such a focus detection apparatus is shown in FIG. 1 of the accompanying drawings.

In FIG. 1, L designates an objective lens and F is its predetermined focal plane. $P_1$ before the focal plane F and $P_2$ behind the focal plane F are two positions substantially, equally distant from the focal plane F. The states of object images formed at the two positions $P_1$ and $P_2$ are detected and compared with each other thereby detecting the in-focus position. This focus detecting apparatus assumes that the two defocused object images are symmetric relative to the point in focus. Thus, strictly speaking, the defocused image before the in-focus position and that behind it must be entirely the same with respect to each other so that the amount of defocus from the in-focus position is the same for the two defocused images.

Lenses without any aberrations can satisfy the above requirement. However, objective lenses generally have some aberrations and therefore the two defocused object images before and behind the focus point can not be symmetric. The two images have different shapes even when they are in positions where their defocus values are equal. This will be described in detail with reference to FIG. 2.

FIG. 2 shows the convergence state of parallel rays passed through the lens L at height h from the optical axis 0 of the lens L. If the lens L is a lens without any aberration, then all the rays passed through it at the respective heights of h would be focused at one point on the optical axis. However, as shown in FIG. 2, the lens L like a common lens has spherical aberration. Therefore, the rays of light can not be focused at one point. For this reason, the cross sections A, B, C and D, E, F of the beam spot taken along planes normal to the optical axis 0 are not symmetrical in shape relative to the focal plane. The two defocused object images before and behind the focus point are not exactly in the same state with respect to each other even when they are in positions of equal amount of defocus from the focal point. This asymmetrical relation between the states of two defocused images causes a detection error in focus detection.

In addition, it is known that if the spatial frequency of an object is higher than a certain level, then there is produced a phenomenon of "pseudo-resolution". If positions at which such pseudo-resolution is produced are asymmetric relative to the focal plane, then the image formed at one of the positions is of pseudo-resolution whereas that at the other position is an image of normal resolution. In this case, the focus detecting apparatus no longer holds the aforementioned preposition that defocused images before and behind the focal plane should be symmetrical relative to the focal plane. This constitutes also a major cause for wrong detection.

BRIEF SUMMARY OF THE INVENTION

Accordingly, it is the object of the present invention to provide a focus detection apparatus with which errors in detection can be minimized.

Other and further objects, features and advantages of the invention will appear more fully from the following description of embodiments with reference to the accompanying drawings.

DESCRIPTION OF PREFERRED EMBODIMENTS

Figure 1:
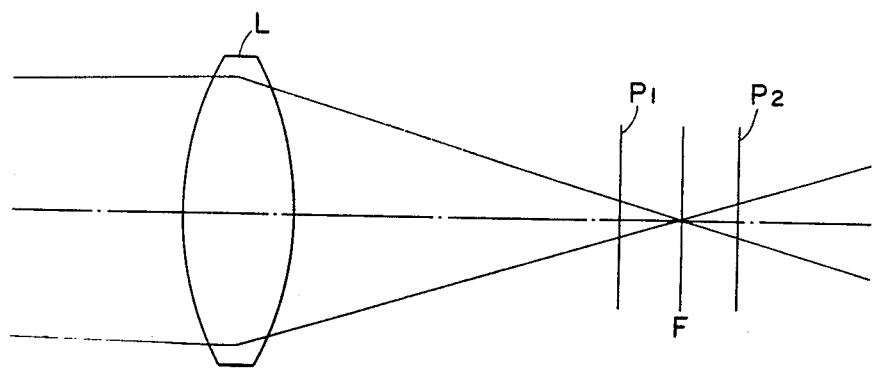
FIG. 1 is a schematic view illustrating the principle of the focus detection apparatus pertinent to the subject of the present invention.
Figure 2:
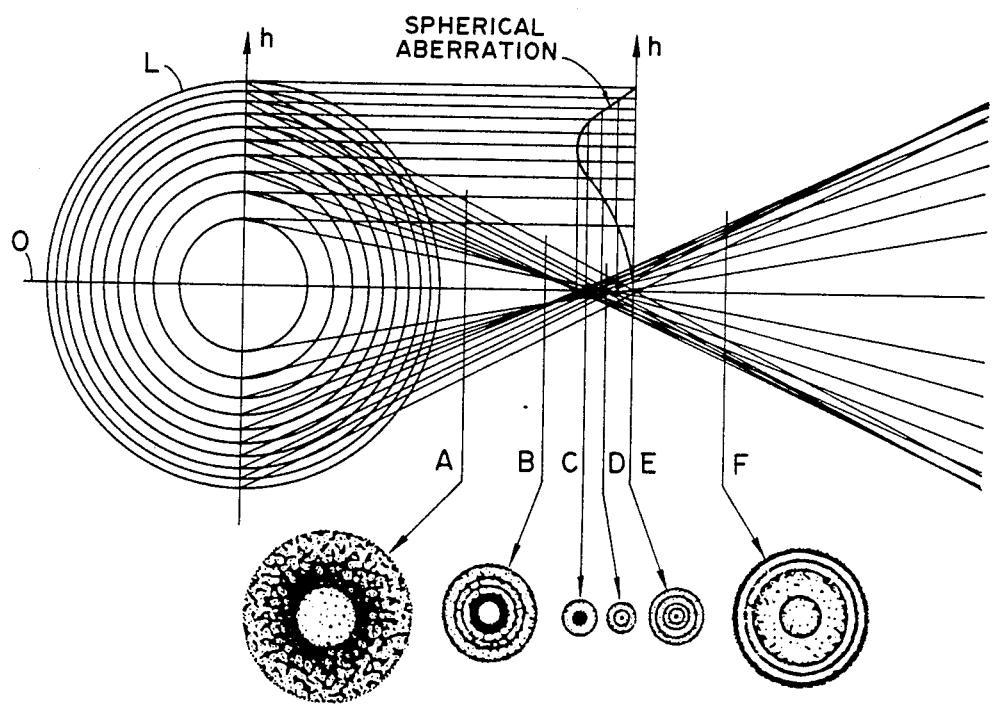
FIG. 2 illustrates the states of defocused images before and behind the focal plane of a lens whose spherical aberration has been corrected.

In the embodiment shown in FIG. 3, the focus detecting apparatus previously described with reference to FIG. 1 is mounted, for example, in a single eyed reflex camera in accordance with the principle shown in FIG.

1. The focus detecting apparatus is mounted in the reflex camera as an apparatus of a TTL system.

Figure 3:
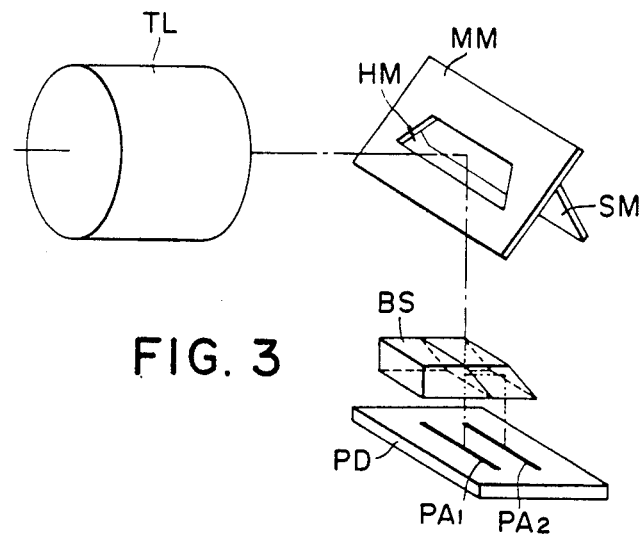
FIG. 3 is a schematic view of an embodiment of the invention illustrating, in particular, the optical arrangement thereof.

In FIG. 3, TL designates a taking lens. MM is a main mirror for a view finder. The main mirror MM has a half mirror portion HM. Designated by SM is a subsidiary mirror for reflecting, for example, downwards the light transmitted through the half mirror portion HM of the main mirror. BS is a beam splitter for splitting the reflected light into two beams with a certain determined optical path difference being given between the two beams. PD is a photoelectric detector comprising photo sensor arrays $PA_1$ and $PA_2$ arranged in two lines. The first photo sensor array $A_1$ is so disposed as to receive one of two beams divided by the beam splitter BS and the second array $A_2$ receives the other one of the two beams. In accordance with the principle previously described with reference to FIG. 1, the photo detector PD is arranged in such a manner that the first photo sensor array $PA_1$ is equivalently at a predetermined distance before the predetermined focal plane of the taking lens TL, that is, the film plane and the second photo sensor array $PA_2$ lies at the same predetermined distance behind the focal plane.

With this arrangement of the focus detecting apparatus, the outputs from the photo sensor arrays $PA_1$ and $PA_2$ give information of the states of images formed at the two positions substantially equally distant before and behind the film plane. Thus, the focusing states of the two images, that is, the image sharpness of the two images can be detected. By comparing the detected sharpness of one image with that of the other image there can be detected the focusing state of the taking lens TL to the object. This focus detection method per se is known. According to the invention, means for regulating the quantity of light is additionally provided to the above arrangement of the focus detecting apparatus. Said light quantity regulating means may be provided, for example, on the main mirror MM or subsidiary mirror SM.

FIGS. 4A through 4F show various concrete forms of a light quantity regulating pattern useful for said light quantity regulating means when said mean is provided on the main mirror MM.

Figure 4A:
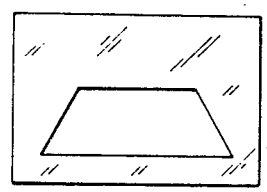
FIGS. 4A, 4B, 4C, 4D, 4E, 4F and 5A, 5B, 5C, 5D, 5E, 5F schematically show various pattern forms of common light quantity regulating means adoptable in the arrangement shown in FIG. 3 and various concrete examples of light quantity regulating means according to the present invention.
Figure 4B:
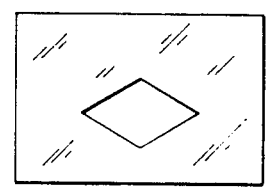
Figure 4C:
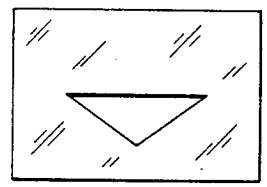
Figure 4D:
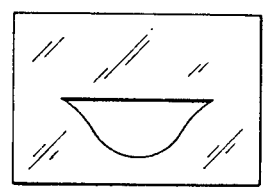
Figure 4E:
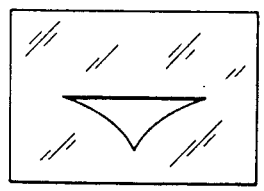
Figure 4F:
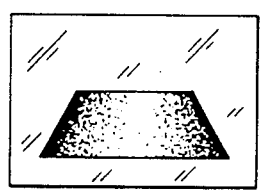

Among the various concrete forms of light regulating pattern, the pattern form shown in FIG. 4A is of a common and conventional mask. The pattern 4A is long in the direction in which the incident beam is detected by the photo sensor arrays $PA_1$ and $PA_2$, and is short in the direction perpendicular to the above detecting direction. The length of the pattern in the beam detecting direction is sufficiently large enough to cover the full effective width of light beam in said direction. Compared with the length of the pattern in the detection direction, the length of the pattern in the direction perpendicular to the detecting direction is markedly shortened. The reason for this is that the short length in this direction is advantageous taking into consideration the size of the optical system required for guiding the light to the photo sensor arrays $PA_1$ and $PA_2$. This form is an example of common masks. With this pattern form 4A, all of the light rays from a center ray to a marginal ray are incident on the photo sensor arrays $PA_1$ and $PA_2$. As seen in FIG. 4A, the mask pattern is in a form of trapezoid. However, since the pattern in provided on the main mirror MM and is inclined 45° as shown in FIG. 3, the mask becomes a rectangle with its long sides extending widthwise with respect to rays passing through the mask.

Forms 4B to 4F are examples of the light regulating pattern (mask) designed according to the invention. The mask 4B is in the form of diamond and 4C is in the form of isosceles triangle. With these masks 4B and 4C, the incident rays are cut off in such a manner that the quantity of light incident on the photo detector is linearly decreased gradually from center to marginal area. The mask 4D is so formed as to cut off incident rays in such a manner that the quantity of marginal rays is decreased according to the formula $1+\cos\theta(-\pi<\theta<\pi)$. With the pattern 4E, incident rays are cut off in such a manner that the quantity of marginal rays is decreased as an exponential function. The light quantity regulating pattern 4F (density pattern of filter) is formed by particularly treating the half mirror portion HM of the main mirror to reduce the light transmissivity gradually from center to marginal area. This form 4F also shows an example of the light quantity regulating pattern according to the invention.

FIGS. 4A to 4F show various light quantity regulating patterns useful when light quantity regulating means according to the invention is provided not on the main mirror MM but on the subsidiary mirror SM.

Figure 5A:
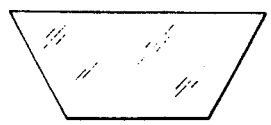
Figure 5B:
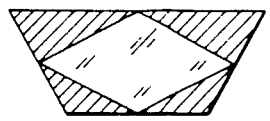
Figure 5C:
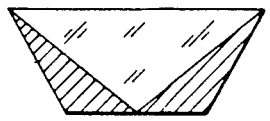
Figure 5D:
Figure 5E:
Figure 5F:

The pattern form in FIG. 5A corresponds to the pattern form 4A and is an example of common and conventional masks. In the direction for detection by the photo sensors $PA_1$ and $PA_2$, the mask 5A is sufficiently long enough to fully cover the effective width of the incident light. In the direction perpendicular to the detecting direction, the length of the mask is shortened taking into consideration the size of the optical system used for guiding light to the photo sensor arrays $PA_1$ and $PA_2$. Again, as far as the direction for the detection by $PA_1$ and $PA_2$ is concerned all of the light rays from a center ray to a marginal ray are uniformly incident on the photo detector. As a whole, the mask 5A is in the form of a trapezoid. However, since it is provided on the subsidiary mask SM which is inclined 45°, the mask becomes a rectangle with its long sides extending widthwise as regards the rays passing through the mask.

Forms in FIGS. 5B to 5F are all light quantity regulating patterns (masks) according to the invention. The masks 5B and 5C correspond to those shown in FIGS. 4B and 4C. With these mask patterns 5B and 5C, the incident light rays are cut off in such a manner that the quantity of the incident light is decreased linearly in the direction towards the marginal area from the center of the incident beam. The pattern 5B is in the form of a diamond and the pattern 5C is an isosceles triangle. The pattern 5D corresponds to the mask 4D and is so formed as to decrease the quantity of marginal rays according to the formula $1+\cos\theta(-\pi<\theta<\pi)$. The mask 5E corresponds to that shown in FIG. 4E and cuts off the incident light in such manner that the quantity of marginal rays incident on the photo detector is decreased exponentially. The light regulating pattern 5F (density pattern of filter) is formed by particularly treating the mirror surface of the subsidiary mirror SM so as to reduce its reflection factor gradually from center to marginal.

Effects obtainable by the provision of such light quantity regulating means will be described hereinafter with reference to FIG. 6.

An object image may be represented by a convolution of point images. Therefore, characteristics of an object image can be examined by analysis of point image.

Figure 6A:
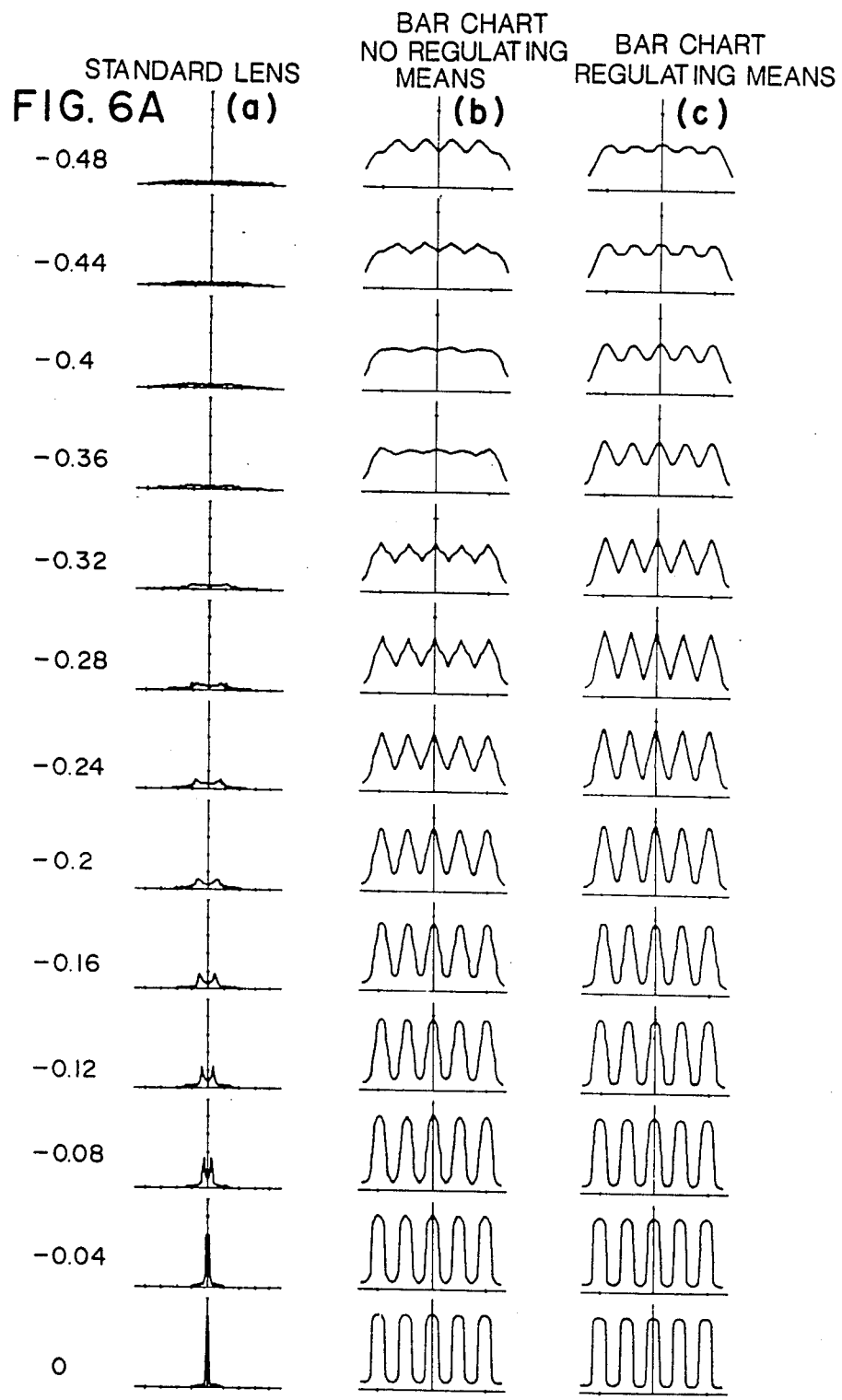
FIGS. 6A and 6B show, for comparison, images of a linear light source at different defocus positions formed through a standard lens (F 1.4), defocused images of a bar chart formed without any light quantity regulating means and defocused images of the bar chart formed with light quantity regulating means in accordance with the present invention.
Figure 6B:
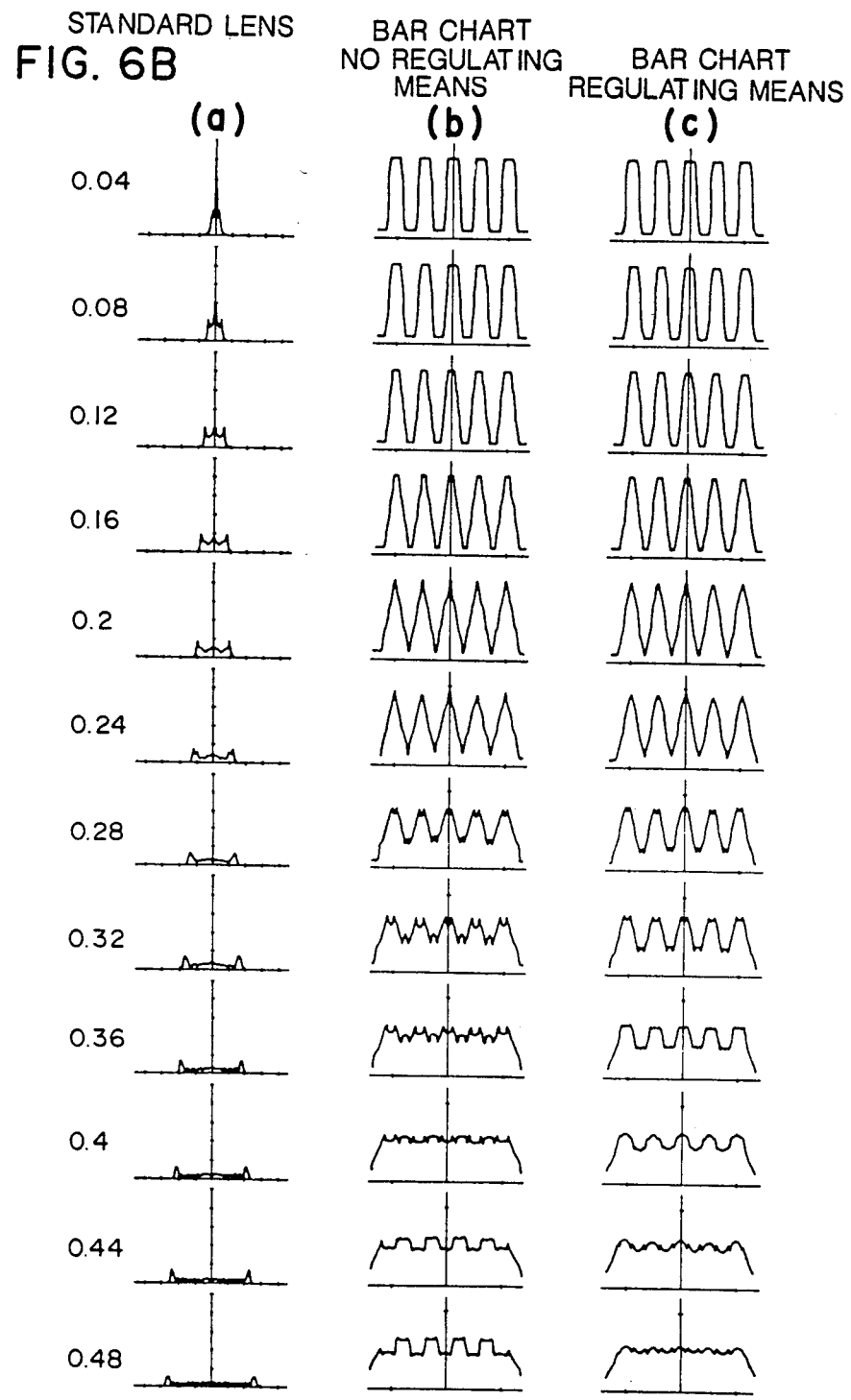

FIG. 6(A) shows defocused spot images at different defocus positions formed without provision of any of the above masks. FIG. 6(B) shows images of a striped pattern such as a resolution chart. Compare two defocused spot images formed before and behind the focal plane and spaced from the focal plane by the same amount of defocus. Then, one can understand that two defocused images of the same object at two positions of equal distance from the focal plane, but one before the focal plane and the other behind it are not equal to each other. The difference between two corresponding defocused spot images before and behind the focal plane demonstrates the difference between the two corresponding defocused images of the same striped pattern formed before and behind the focal plane.

For example, the defocused image of spot image formed at a defocus position of $-0.4$ is of gently sloping distribution. In contrast, the defocused image of the same spot image formed at the corresponding defocus position of $+0.4$ has two peaks of illuminance at both ends. Such a difference between the two defocused images before and behind the focal plane is caused by the so-called "caustics" due to the aberration of lens. The form of caustics varies according to the type of aberration. However, it is very seldom that caustics formed before the focal plane and that behind it are symmetric. It is also known that such caustics is formed by those rays which pass through the area from the middle to the edge of a pupil plane. Therefore, by reducing the light quantity of such marginal rays attributable to caustics by employing a mask or a filter, it is made possible to decrease the illuminance of the caustics portion and to slope down the illuminance peaks of the defocused image. Thus, there are obtainable before and behind the focal plane two corresponding defocused images which resemble each other in form and shape.

FIG. 6B(C) shows defocused images of a bar chart having a spatial frequency of 4 lines/mm on the image plane formed using light quantity regulating means according to the invention. As light quantity regulating means there was used that shown in FIG. 4C. Said light quantity means was provided on the main mirror MM. FIG. 6(C) demonstrates that the provision of light quantity regulating means has a considerable effect to improve the symmetry of two corresponding defocused images before and behind the in-focus point.

As described above, light quantity regulating means according to the invention serves to cut off marginal rays more and more towards the direction away from the central rays. Therefore, the weight of marginal rays having larger aberration is reduced as compared with that of the central rays of the incident light. Accordingly, there is obtained such a distribution of light quantity in which the quantity of incident light on the photo detector is decreased gradually in the direction from the center area to the marginal area. This distribution of light quantity has an effect of giving gentle and uniform shapes to defocused images thereby improving the symmetry of two corresponding defocused images before and behind the focal plane.

The above effect obtainable by the provision of light quantity regulating means according to the invention may be elucidated also by spatial frequency.

Figure 7A:
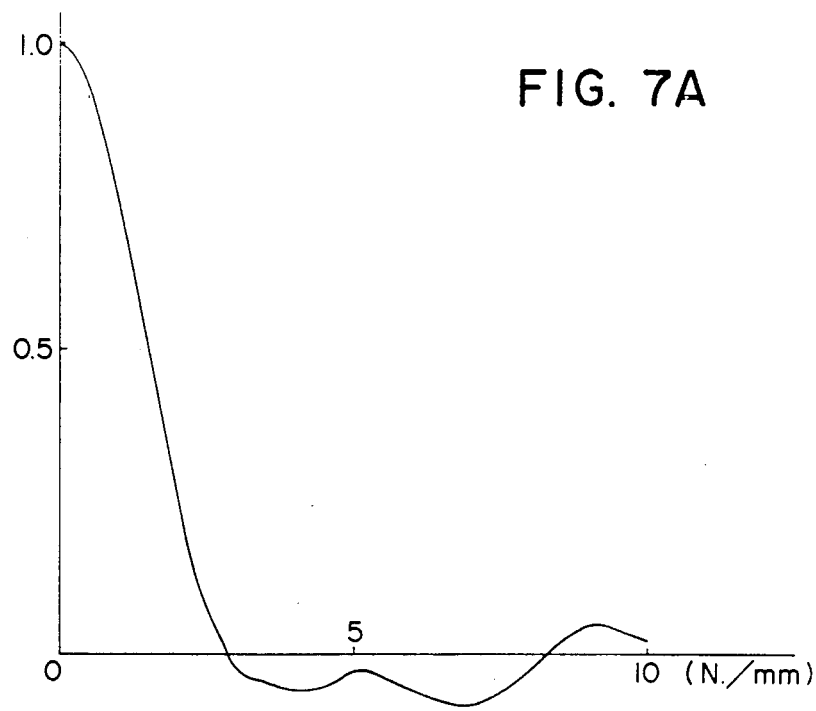
FIGS. 7A and 7B show the relations of spatial frequency characteristics (OTF curve) to a common form of light regulating pattern and to that according to the present invention as shown in FIGS. 4 and 5, respectively.
Figure 7B:
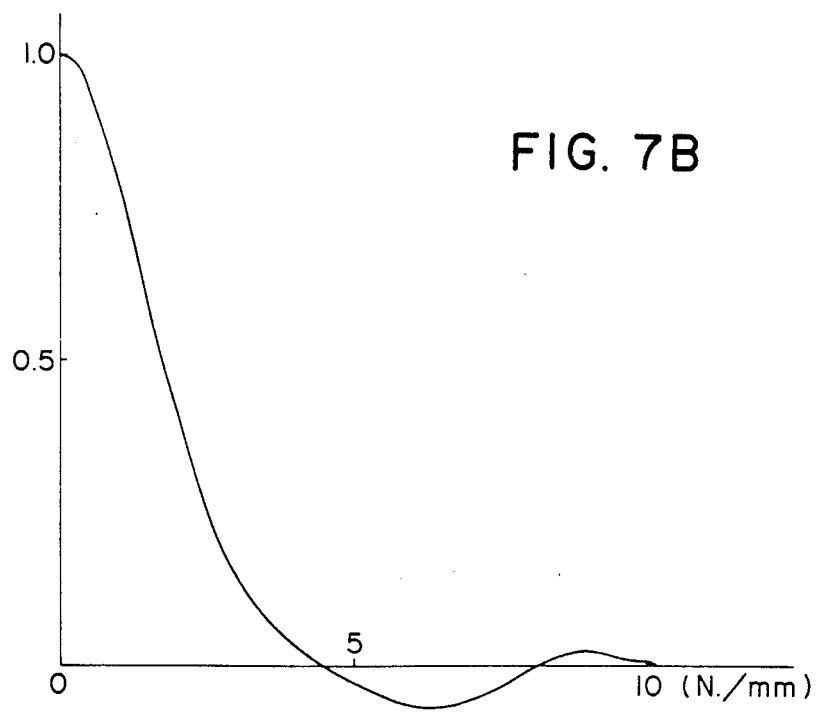

FIGS. 7A and 7B are OTF curves. The OTF curve shown in FIG. 7A is of the spatial frequency characteristic of defocused image obtained when a common opening pattern as shown in FIGS. 4A or 5A was used.

The OTF curve shown in FIG. 7B is of the spatial frequency characteristic of defocused image obtained when a light quantity regulating pattern (opening) as shown in FIGS. 4B, 5B, 4C or 5C according to the invention. As clearly seen from FIGS. 7A and 7B, the high frequency component is markedly reduced in OTF curve shown in FIG. 7B as compared with that of FIG. 7A. For a spatial frequency, when OTF value becomes negative, then there is produced the phenomenon of pseudo-resolution at the spatial frequency. Comparing FIG. 7A with FIG. 7B, one can understand that the absolute value of negative value is smaller in FIG. 7B curve than in FIG. 7A curve and that the frequency range where OTF value becomes negative is narrower in FIG. 7B curve than in FIG. 7A curve. This demonstrates that the light quantity regulating pattern according to the invention has a markedly large effect to lessen the adverse effect of pseudo-resolution.

As seen in FIG. 6, two corresponding defocused images before and behind the focal plane look different than each other mainly because of the presence of a saw tooth portion like a sharp nose waveform. A component attributable to this saw tooth portion is high spatial frequency component. Therefore, by using light quantity regulating means so designed as to reduce the high frequency component attributable to pseudo-resolution there is obtainable defocused images which contain no such a high frequency component. For such defocused image, only the contrast is gradually decreased with increases of the amount of defocus. Consequently, the symmetry of two corresponding defocused images before and behind the focal plane can be improved to a great extent.

As well known to those skilled in the art, Fourier transformation of pupil function gives the function indicative of spatial frequency characteristic of image (OTF). Therefore, the pattern forms of light quantity regulating means according to the invention are never limited to only those forms and intensity distribution shown in FIGS. 4B to 4F or FIGS. 5B to 5F. Any other form may be used provided that the function obtained by Fourier transformation of the function representing the form is one which increases lower frequency component and decreases higher frequency component by which the phenomenon of pseudo-resolution may be caused.

Now, we will describe some embodiments of the focus detection apparatus using light regulating means according to the invention and improvements in the apparatus attained by said light quantity regulating means. In the focus detection apparatus, images formed at two corresponding positions substantially, equally distant before and behind the predetermined focal plane of an objective lens are compared to each other in image sharpness using light quantity regulating means. Relying on the result of the comparison, the focusing state of the object lens is detected.

Figure 8:
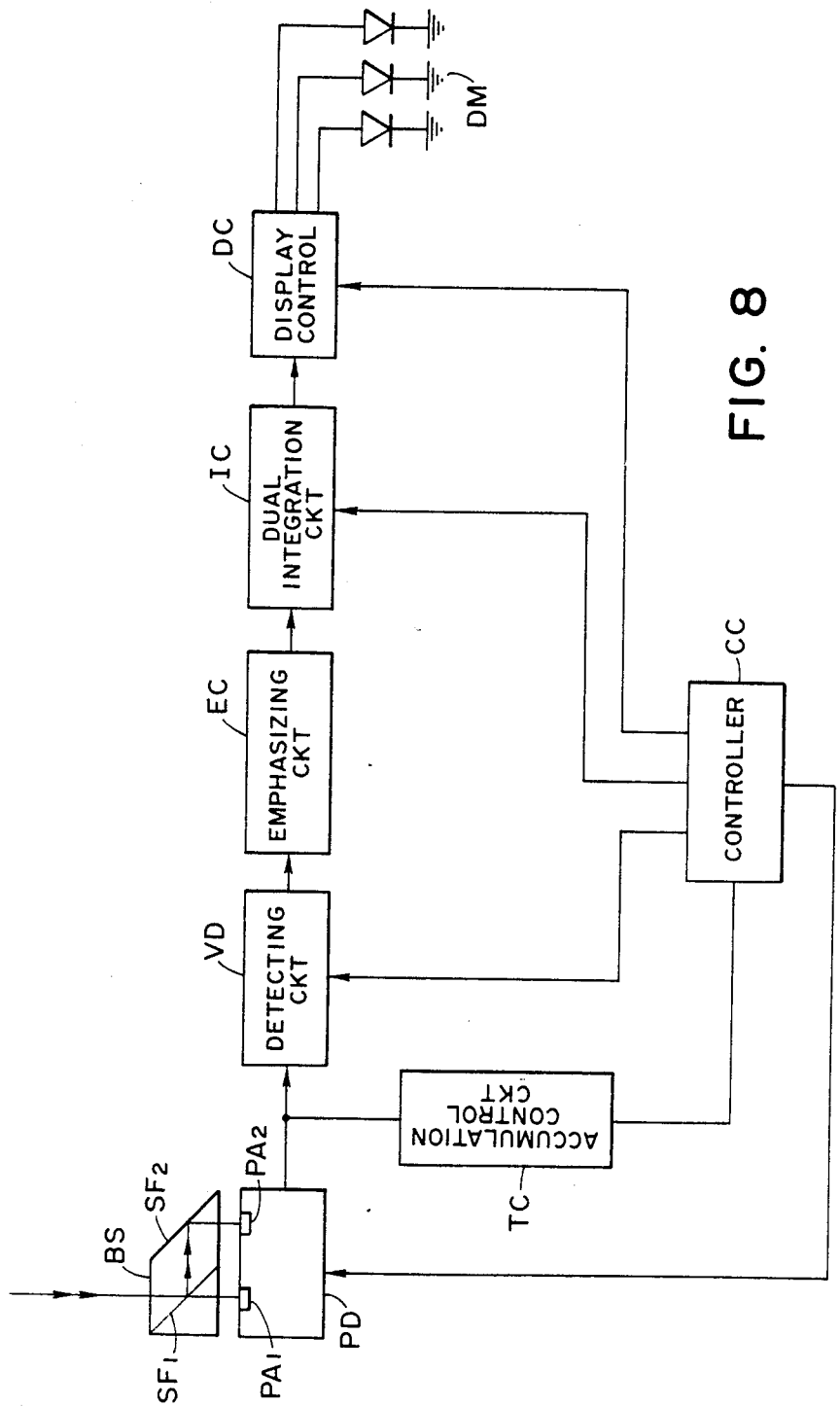
FIG. 8 is a block diagram of a focus detection circuit system adoptable in the arrangement shown in FIG. 3.

Referring to FIG. 8 showing an embodiment of the focus detection apparatus, the reference character BS designates a beam splitter as previously described with reference to FIG. 3. The beam splitter BS has a semi-transmissive surface $SF_1$ and a total reflection surface $SF_2$. The light transmitted through the semi-transmissive surface $SF_1$ is further reflected by the total reflection surface $SF_2$ towards the second photo sensor array $PA_2$. As previously noted, the optical arrangement of two photo sensor arrays $PA_1$ and $PA_2$ is set in such a manner that one of the arrays $PA_1$ and $PA_2$ lies at a certain distance before the predetermined focal plane of the taking lens TL and the other is at substantially the same distance after the focal plane. Each of the photo sensor arrays $PA_1$ and $PA_2$ comprises a plural number of photoelectric photo receptor elements. The detector PD is formed as a picture pickup device provided with the function of generating the photoelectric outputs from the respective elements in time-series signals. For example, the detector may be formed as a photo diode array (MOS image sensor), CCD or BBD. For the purpose of explanation, such a device is generally represented by photoelectric detector PD in the drawings. The output from the photoelectric detector PD, namely, the time-series signal of the outputs of the individual photo receptor elements becomes a time-series signal of illuminance distribution of the image. Hereinafter, said output is referred simply as video signal. The level of the video signal is controlled by controlling the time during which photo-electric conversion signals are accumulated in the respective photo-electric converter elements (this time is referred to as accumulation time). Generally, the above mentioned solid image pickup device, such as MOS image sensor, CCD and BBD, is featured in that it has a function to put out the photoelectric conversion outputs of the respective photo receptor elements only after said conversion outputs have been accumulated for a certain determined time. Therefore, the use of such a device as the detector PD in the apparatus brings forth a particular advantage. The accumulation time is controlled according to the brightness of the image. The control of the accumulation time must be done in such a manner that the level of the above video signal may be kept always at a proper level. To this end, the video signal is introduced into an accumulation time control circuit TC for controlling the video signal level. On the other hand, the video signal is introduced into a detecting circuit VD for detecting the change of said signal in order to extract the necessary information of image shapness from the video signal. Concretely, the detection circuit VD may be composed of a differentiation circuit or a combination of a delay circuit and a differential circuit. The output from the video signal change detecting circuit VD corresponds to AC component of the video signal excepting DC component thereof. Amplitude of the AC component becomes larger with increases of the sharpness. The output is introduced into an emphasizing circuit EC which functions to emphasize the larger amplitude portion of said AC component while suppressing the smaller amplitude portion. Therefore, the output of the emphasizing circuit responds to sharpness with very high sensitivity. When the sharpness becomes higher and the level difference between dark and bright in the image becomes larger, AC component of the video signal has a larger amplitude. The larger the amplitude of the AC component is, the more the emphasizing circuit EC emphasizes it. On the contrary, when the sharpness becomes lower and the amplitude of AC component becomes smaller, the emphasizing circuit EC suppresses it more. Consequently, the output level of the emphasizing circuit EC rises up abruptly with a rise-up of the sharpness.

Designated by IC is a dual integration circuit whose function is to carry out integration and inverse integration of the outputs from the emphasizing circuit EC all over the predetermined image reception area. More particularly, the dual integration circuit IC performs the following functions:

First, it integrates the outputs already subjected to processing up to the emphasizing circuit EC for video signals corresponding to any one reception area (hereinafter referred to as visual field) of two photo sensor arrays $PA_1$ and $PA_2$. Second, from the obtained integrated value it carries out an inverse integration at a determined decay rate to time to specify the level of said integrated value. Therefore, the fundamental function of the dual integration circuit IC is to specify the level of the integrated value of processed video signal outputs derived from any one of the photo sensor arrays $PA_1$ and $PA_2$.

The circuit IC carries out the above integration and inverse integration for both of $PA_1$ video signal output and $PA_2$ video signal output sequentially after they have been processed up to the step of the emphasizing circuit EC. Each of the results obtained by the dual integation circuit IC is introduced into an after-connected display control circuit DC. As will be readily understood from the above description, the level of the integrated value specified by the circuit IC corresponds to the sharpness of the image in the visual field of the photo sensor array $PA_1$ or $PA_2$. Therefore, the output of the circuit IC for the view field of $PA_1$ and that for $PA_2$ are compared with each other in the display control circuit DC. Based on the result of the comparison, a display is made by means of suitable display means DM formed of, for example a, LED. Reading the display made by said display means DM, the operator knows the state of focusing of the taking lens TL and can adjust the lens TL to the predetermined focal plane. All of the above described operations for photo reception, various signal processing and control are carried out in a predetermined sequence. These are carried out by means of control outputs from a controller CC.

As for the concrete forms of various circuits described above and shown in FIG. 8 there may be used, for example, arrangements as diclosed in the specification of our prior application, Japanese Patent Application No. 63378/1979.

As previously described with reference to FIG. 3, light quantity regulating means according to the invention (FIGS. 4B-F and FIGS. 5B-F) is disposed in the optical path of the taking lens TL. For example, it may be disposed in front of the beam splitter BS.

Figure 9:
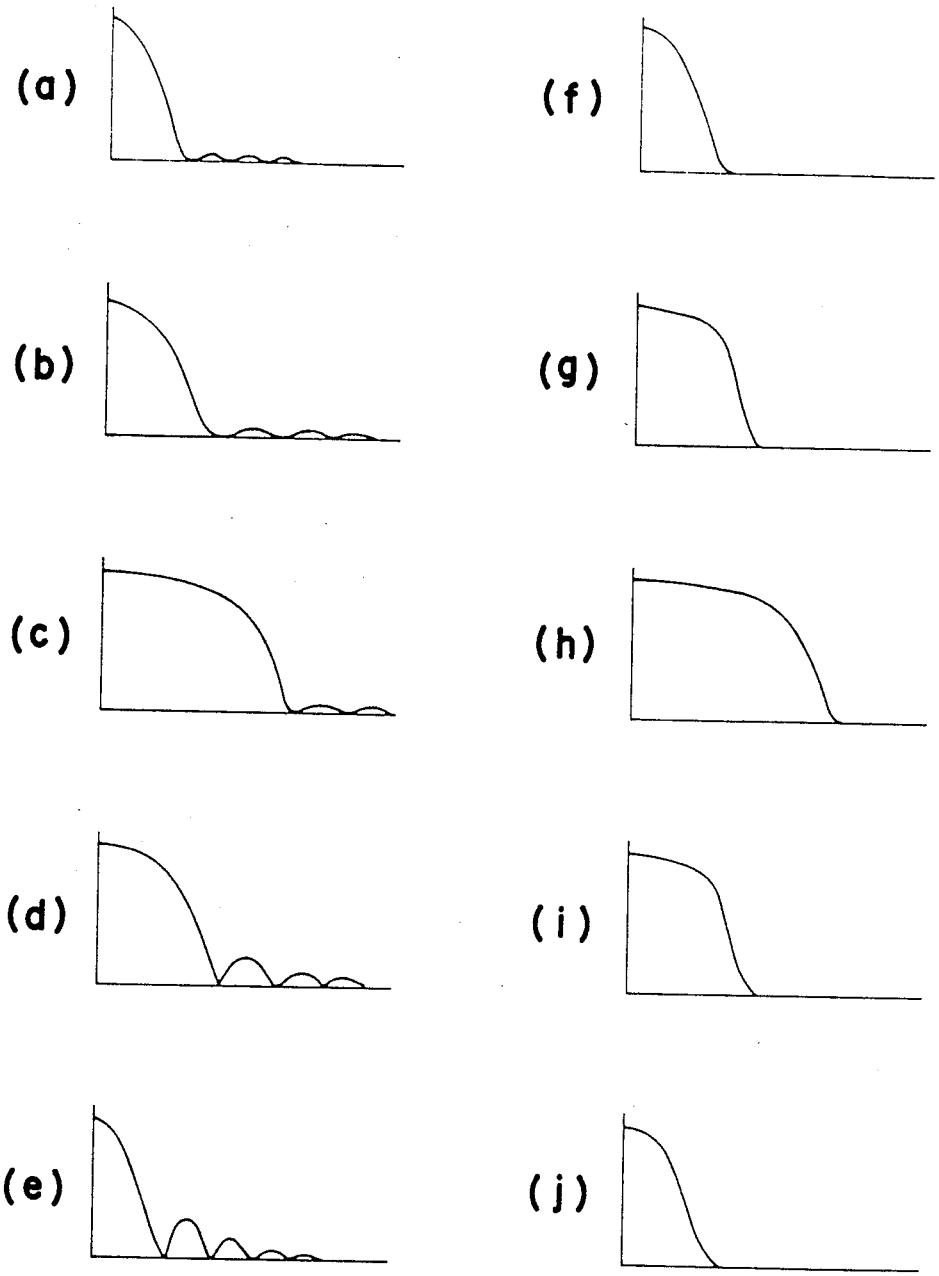
FIG. 9 shows the change of spatial frequency characteristic of an image with focusing of the lens using common light regulating pattern forms and that using the light regulating pattern forms shown in FIGS. 4 and 5 for comparison.

FIG. 9 shows the change of spatial frequency characteristic of an image with focusing when different patterns of light quantity regulating means are used.

Characteristic curves (a) to (e) were obtained when the conventional rectangular form of light quantity regulating pattern (FIG. 4A, FIG. 5A) was used. Curves (f) to (j) were obtained when light quantity regulating patterns according to the invention (FIGS. 4B-F, FIGS. 5B-F) were used. Curves (a) and (f), (b) and (g), (c) and (h), (d) and (i) and (e) and (j) are compared each other. Of these curves, (c) for conventional rectangular mask pattern and (h) for one of the present invention show the spatial frequency characteristics of the image in-focus. (a) and (f) and (b) and (g) show the spatial frequency characteristics of defocused images, that is, short-focused images. (d) and (i) and (e) and (j) show the spatial frequency characteristics of long-focused images. It is seen from these characteristic curves that when the conventional rectangular mask is used, there is always produced the so-called side lobe and the produced side lobe has some difference in degree between the short-focused state and the long-focused state. In contrast, when there are used light quantity regulating patterns according to the invention, such side lobe completely disappears or greatly decreases. As a result, the spatial frequency characteristic of the short-focused image and that of the long-focused image become substantially the same.

In this manner, a remarkable improvement in spatial frequency characteristic of an image can be attained by using a light quantity regulating pattern according to the invention. This leads to improvement in accuracy of focus detection. The improvement in accuracy of focus detection will be described hereinafter with reference to FIG. 10.

Figure 10:
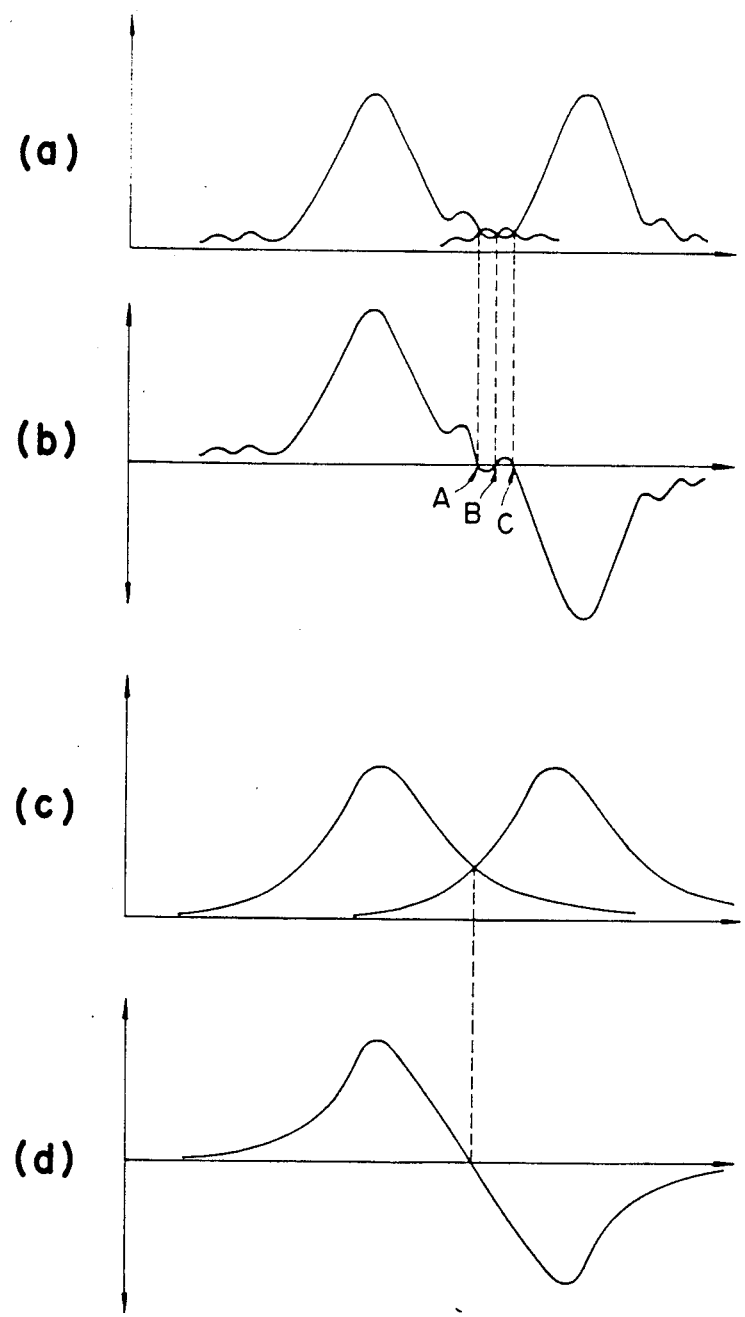
FIG. 10 shows the manner of change of the output from the dual integration circuit in the system shown in FIG. 8 with lens focusing and the manner of change of difference signal regarding two positions before and behind the predetermined focal plane with lens focusing, for common light regulating pattern forms and for light regulating pattern forms shown in FIGS. 4 and 5 for the sake of comparison.

In FIG. 10, curves (a) and (c) show the change of output from the dual integration circuit IC (FIG. 8) with movement of the taking lens TL. But, the curve (a) is that obtained when the conventional rectangular mask pattern and the curve (c) is that obtained when one of the light quantity regulating patterns according to the invention. As previously described, the output of the dual integration circuit IC is a signal corresponding to the sharpness of image on the photo sensor array $PA_1$ or $PA_2$ (this signal is referred to hereinafter as focus signal). The focus signal changes with movement of the taking lens TL. Positions to which the taking lens TL is moved are plotted on the abscissa in FIG. 10. The adverse effect of the side lobe aforementioned in connection with FIG. 9 is clearly observed in the curve (a) of FIG. 10. When the image on each the photo sensor array $PA_1$, $PA_2$ is defocused more and more, the output fluctuates with movement of the taking lens TL due to the effect of the side lobe. Consequently, the focus signal derived from each of the photo sensor arrays $PA_1$ and $PA_2$ does not describe any symmetrical one-peak curve. The curve (a) has small peaks at its skirt. In contrast, when a light quantity regulating pattern is used, such side lobe is lost completely or reduced to a great extent as mentioned above. Consequently, the focus signal derived therefrom describes a one-peak curve having a good symmetrical shape as shown in curve (c).

When the focus detection is to be carried out by using a signal of difference between two focus signals, the curve of the difference signal is shown by curve (b) in FIG. 10 for conventional rectangular mask pattern and by curve (d) for a mask pattern according to the invention. As seen from the curve (b), in case of conventional rectangular mask pattern, there appear a plural number of 0(zero) points (A,B,C) which will cause errors in operation of focus detection. In contrast, in the case of the present invention, there appears only one 0(zero) point. This assures a very accurate focus detection.

As will be understood from the foregoing, the present invention has particular effects to improve the performance and accuracy of focus detection in the above mentioned type of focus detecting apparatus.

According to the invention, the symmetry of defocused images before and behind the predetermined focal plane of an image forming optical system is greatly improved. Therefore, when the present invention is applied to such a type of focus detecting apparatus in which the focusing state of an image forming optical system to an object is detected by detecting the focused state of the object image at least two positions substantially, equally distant before and behind the predetermined focal plane of the optical system, the detection accuracy and detection ability of the apparatus can be greatly improved.

While the invention has been particularly shown and described with reference to preferred embodiments thereof, it will be understood by those skilled in the art that various modifications may be made therein. For example, in the arrangement of the apparatus shown in FIG. 3, said light quantity regulating means may be provided at any suitable position other than the main mirror MM or the subsidiary mirror SM. The thing essential is to provide it in the optical path of light for focus detection and at a position where it can be mounted very easily and its effect can be fully obtained. Also, as to the form and structure of light quantity regulating means, many modifications are possible in the light of the above teachings. The forms shown in FIGS. 4B–4F and 5B–5F are mere examples of many possible forms of light quantity regulating means according to the invention. Further, while in the above embodiments two photoelectric detectors have been arranged in the apparatus, one before the predetermined focal plane and the other behind it, one or two more photoelectric detectors may be provided on the focal plane or at positions further remote from the focal plane.

What we claim is:

1. A focus detecting apparatus, comprising:
an image forming optical system for forming an image of an object on a predetermined focal plane;
at least two photoelectric detectors disposed so as to maintain a predetermined positional relation therebetween relative to said predetermined focal plane;
light quantity regulating means for compensating for aberrations of said optical system and being disposed in the optical path of the light in said optical system coming towards said photoelectric detectors to decrease the quantity of the light continuously from the center to a marginal area of the optical path; and
means for measuring the state of focus of the object image formed on said predetermined focal plane by means of the outputs from said photoelectric detectors.

2. A focus detecting apparatus, comprising:
an image forming optical system for forming an object image on a predetermined focal plane in which image detection means is provided;
an optical path dividing device disposed in the optical path of said image forming optical system to direct the light coming from said image forming optical system towards a finder optical system;
at least two photoelectric detectors disposed so as to maintain a predetermined positional relation therebetween relative to said predetermined focal plane;
light quantity regulating means for compensating for aberrations of said optical system and being disposed in the optical path of light in said optical system between said optical path dividing device and said photoelectric detectors to decrease the quantity of light continuously from the center to a marginal area of the optical path; and
means for measuring the state of focus of the object image on said predetermined focal plane by means of the outputs from said photoelectric detectors.

3. A focus detecting apparatus, comprising:
an image forming optical system for forming an image of an object on a predetermined focal plane;
photoelectric detecting means for detecting the image of the object at least at two different positions on the optical axis of said image forming optical system;

light quantity regulating means for compensating for aberrations of said image forming optical system and being disposed in the path of light in said optical system coming towards said photoelectric detecting means to decrease the quantity of the light from the center to a marginal area of the path; and means for detecting the state of the image formed on said predetermined focal plane on the basis of the detected state of the image at least at said two different positions.

* * * * *

UNITED STATES PATENT AND TRADEMARK OFFICE
CERTIFICATE OF CORRECTION

PATENT NO. : 4,547,663

DATED : October 15, 1985

INVENTOR(S) : NOZOMU KITAGISHI, ET AL.

It is certified that error appears in the above-identified patent and that said Letters Patent is hereby corrected as shown below:

Column 1, line 6, "No. 513,628" should read --No. 531,628--.

Column 2, line 67, "single eyed" should read --single-eyed--.

Column 3, line 4, "view finder." should read --viewfinder--;
line 42, "said mean" should read --said means--;
lines 63-64, "a form of trapezoid" should read --the form of a trapezoid--.

Column 4, line 34, "concerned all" should read --concerned, all--;
line 55, "such manner" should read --such a manner--.

Column 5, line 38, "FIG. 6B(C)" should read --FIG. 6B(c)--;
line 44, "FIG. 6(C)" should read --FIG.6B(c)--.

Column 6, line 5, add --is used-- after "invention";
lines 21-22, "saw tooth" should read --sawtooth--;
line 23, "saw tooth" should read --sawtooth--;
line 28, "such a high frequency component. For such defocused" should read --such high frequency component. For such a defocused--.

UNITED STATES PATENT AND TRADEMARK OFFICE
CERTIFICATE OF CORRECTION

PATENT NO. : 4,547,663　　　　　　　　　　　　　Page 2 of 2

DATED : October 15, 1985

INVENTOR(S) : NOZOMU KITAGISHI, ET AL.

It is certified that error appears in the above-identified patent and that said Letters Patent is hereby corrected as shown below:

```
Column 7, line 17, "referred simply" to --referred to
              simply--;
          line 22, "above-mentioned" should read
              --above-mentioned--.

Column 8, line 28, "a," should read --, a--;
  lines 55-56, "com- pared each" should read
              --compared with each--.

Column 9, line 19, insert --is used-- after "invention";
          line 28, "each the photo" should read --each
              photo--;
          lines 55-56, "abovementioned" should read
              --above-mentioned--

Column 10,line 22, "further remote" should read --more
              remote--.
```

Signed and Sealed this
Eleventh Day of November, 1986

*Attest:*

DONALD J. QUIGG

*Attesting Officer*　　　　*Commissioner of Patents and Trademarks*